(12) United States Patent
Kim et al.

(10) Patent No.: US 7,801,078 B2
(45) Date of Patent: Sep. 21, 2010

(54) IP ADDRESSING TO SUPPORT IPV4 AND IPV6

(75) Inventors: Yong-Ho Kim, Anyang (KR); Ki-Seon Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 939 days.

(21) Appl. No.: 11/124,011

(22) Filed: May 6, 2005

(65) Prior Publication Data

US 2005/0265360 A1 Dec. 1, 2005

Related U.S. Application Data

(60) Provisional application No. 60/568,738, filed on May 7, 2004.

(30) Foreign Application Priority Data

| Oct. 5, 2004 | (KR) | ........................ 10-2004-079266 |
| Nov. 3, 2004 | (KR) | ........................ 10-2004-089010 |
| May 4, 2005 | (KR) | ........................ 10-2005-037762 |

(51) Int. Cl.
| H04L 12/28 | (2006.01) |
| H04L 12/16 | (2006.01) |
| H04W 4/00 | (2009.01) |
| H04J 3/24 | (2006.01) |
| G06F 15/16 | (2006.01) |

(52) U.S. Cl. ........................ 370/331; 370/255; 370/270; 370/466; 709/237

(58) Field of Classification Search ................. 370/255, 370/270, 328, 331, 466; 709/237
See application file for complete search history.

(56) References Cited

U.S. PATENT DOCUMENTS

| 6,144,653 | A | * | 11/2000 | Persson et al. .............. 370/337 |
| 6,385,451 | B1 | | 5/2002 | Kalliokulju et al. |
| 6,590,880 | B1 | | 7/2003 | Maenpaaet et al. |
| 6,665,713 | B1 | | 12/2003 | Hada et al. |
| 6,704,789 | B1 | * | 3/2004 | Ala-Laurila et al. ......... 709/230 |
| 6,735,202 | B1 | * | 5/2004 | Ahmed et al. ............... 370/392 |
| 6,766,168 | B1 | | 7/2004 | Lim |
| 6,982,967 | B1 | * | 1/2006 | Leung ......................... 370/328 |
| 7,006,472 | B1 | * | 2/2006 | Immonen et al. ............ 370/332 |
| 7,213,057 | B2 | | 5/2007 | Trethewey et al. |
| 7,218,634 | B1 | * | 5/2007 | Khalil et al. ................. 370/392 |
| 2001/0024443 | A1 | * | 9/2001 | Alriksson et al. ............ 370/401 |
| 2002/0062388 | A1 | * | 5/2002 | Ogier et al. .................. 709/238 |

(Continued)

FOREIGN PATENT DOCUMENTS

CA 2395638 5/2002

(Continued)

OTHER PUBLICATIONS

R. Droms, "RFC 2131: Dynamic Host Configuration Protocol," Mar. 1997, Network Working Group, Bucknell University.*

(Continued)

*Primary Examiner*—Dang T Ton
*Assistant Examiner*—Ryan C Kavleski
(74) *Attorney, Agent, or Firm*—Lee, Hong, Degerman, Kang & Waimey

(57) ABSTRACT

A broadcast dedicated connection identifier is used for broadcasting certain types of Internet Protocol (IP) control messages to allow proper IP address establishment for IPv4 and IPv6.

8 Claims, 8 Drawing Sheets

U.S. PATENT DOCUMENTS

| | | |
|---|---|---|
| 2002/0098840 A1* | 7/2002 | Hanson et al. ............... 455/435 |
| 2002/0114293 A1 | 8/2002 | Madour et al. |
| 2002/0118656 A1 | 8/2002 | Agrawal et al. |
| 2002/0141361 A1 | 10/2002 | Madour et al. |
| 2003/0076808 A1 | 4/2003 | McNiff et al. |
| 2003/0142642 A1* | 7/2003 | Agrawal et al. ............. 370/328 |
| 2003/0185236 A1* | 10/2003 | Asano et al. ................. 370/469 |
| 2004/0002333 A1 | 1/2004 | Neufeld |
| 2004/0013111 A1* | 1/2004 | Faccin ........................ 370/378 |
| 2004/0068571 A1 | 4/2004 | Ahmavaara |
| 2004/0082312 A1 | 4/2004 | O'Neill et al. |
| 2004/0085957 A1 | 5/2004 | Verma |
| 2004/0122976 A1 | 6/2004 | Dutta et al. |
| 2004/0157607 A1 | 8/2004 | Kim et al. |
| 2004/0179532 A1* | 9/2004 | Thubert et al. ............ 370/395.5 |
| 2004/0185852 A1* | 9/2004 | Son et al. .................... 455/438 |
| 2004/0203596 A1 | 10/2004 | Sreemanthula et al. |
| 2004/0203765 A1 | 10/2004 | Das et al. |
| 2004/0218556 A1 | 11/2004 | Son et al. |
| 2004/0235536 A1 | 11/2004 | Kim et al. |
| 2004/0266436 A1 | 12/2004 | Jaakkola et al. |
| 2005/0025164 A1 | 2/2005 | Kavanagh et al. |
| 2005/0027834 A1* | 2/2005 | Chen et al. .................. 709/222 |
| 2005/0130660 A1 | 6/2005 | Park et al. |
| 2005/0165953 A1* | 7/2005 | Oba et al. .................... 709/238 |
| 2005/0197133 A1* | 9/2005 | Hong et al. ................. 455/450 |
| 2005/0213539 A1 | 9/2005 | Dutta et al. |

FOREIGN PATENT DOCUMENTS

| | | |
|---|---|---|
| CA | 2397966 | 5/2002 |
| CA | 002397966 A1 | 5/2002 |
| JP | 07-058771 | 3/1995 |
| JP | 09331580 | 12/1997 |
| JP | 11-103320 | 4/1999 |
| JP | 2002-186010 | 6/2002 |
| JP | 2002344479 | 11/2002 |
| JP | 2003274438 | 9/2003 |
| JP | 2004-120171 | 4/2004 |
| KR | 20000056076 | 9/2000 |
| WO | 2004021728 A2 | 3/2004 |

OTHER PUBLICATIONS

Carl Eklund, "IEEE Standard 802.16: A Technical Overview of the WirelessMAN Air Interface for Broadband Wireless Access," Jun. 2002, IEEE Communications Magazine, p. 98-107.*

IEEE "Part 16: Air Interface for Fixed and Mobile Broadband Wireless Access Systems—Amendment for Physical and Medium Access Control Layers for Combined Fixed and Mobile Operation in Licensed Bands", IEEE 802. 16e-03/07r5, IEEE 802.16 TGe working Document, Dec. 9, 2003.

Kitroser, I. et al. "IEE802.16e Sleep Mode", IEEE C802.16e-03/15, IEEE 802.16 Broadband Wireless Access Working Group, Mar. 6, 2003.

Kim, Y. et al. "Management of Sleep Windows Size during Handover", IEEE C802.16E-04/75, IEEE 802.16 Broadband Wireless Access Working Group, May 10, 2004.

* cited by examiner

IP ADDRESSING TO SUPPORT IPV4 AND IPV6

CROSS REFERENCE TO RELATED APPLICATIONS

The present application claims the benefit of Korean patent application number 10-2004-079226 filed Oct. 5, 2004, Korean patent application number 10-2004-089010 filed Nov. 3, 2004, and Korean patent application number 10-2005-037762 filed May 4, 2005, the disclosures of which are incorporated herein by reference, and the benefit of U.S. provisional application No. 60/568,738 filed May 7, 2004, the disclosure of which is incorporated herein by reference.

BACKGROUND ART

The present invention relates to a method of transmitting an IP (Internet Protocol) address establishment control message applicable to a broadband wireless access system, and more particularly, to a method of transmitting a message in broadcast or multicast format for address establishment to support Mobile IPv4 and Mobile IPv6. Also, the present invention method supports a Mobile IPv4 and IPv6 mobile station that may use idle mode to minimize its power consumption.

Considering the communication protocols related to wireless (radio) access systems, at the network layer, to allow proper data packet communication via the Internet, an Internet Protocol (IP) provides the necessary addressing and routing information for the packets. Here, each device (e.g., user terminal, mobile handset, wireless connectivity device, mobile subscriber station (MSS), etc.) connected via the Internet requires the establishment of a unique IP address in order for that device to be properly identified and distinguished from other devices.

The Internet Protocols referred to as IP version 4 (IPv4) and IP version 6 (IPv6) have been developed. By employing 32-bit addresses, IPv4 has been found to have limitations because of the increasing popularity of Internet communications, whereby each device connected with the Internet needs its own unique IP address. As such, because the availability of 32-bit addresses would soon be exhausted, an enhancement was developed, namely, IPv6, which employs 128-bit addresses. Among such Internet Protocols, an example used in supporting the mobility aspects of user devices (e.g., user terminal, mobile handset, wireless connectivity device, mobile subscriber station (MSS), etc.) may be referred to as Mobility IPv4.

Many wireless networks and devices still employ IPv4 addressing and do not support IPv6 addressing. As future networks and devices are being developed to support only IPv6, and until all networks and devices transition from IPv4 addressing to IPv6 addressing, an interim solution that allows networks and devices to concurrently support both IPv4 and IPv6 is desirable and necessary.

A network that supports Mobile IPv4 comprises a home agent (HA), a foreign agent (FA) and a mobile station.

The Mobile IPv4 operation is as follows. When a mobile node receives an agent advertisement message and determined whether it is located in its home network or in an external network (e.g., a foreign network). Also, a Care-of-Address (CoA) obtained from the foreign network is registered at the home agent (HA).

Table 1 shows an example of an agent advertisement message that is broadcast with respect to Mobile IPv4. When information related to the foreign agent or home agent (FA/HA) is broadcast from the mobile IP to the mobile station, the agent advertisement message shown in the following Table 1 may be used.

TABLE 1

| Vers = 4 | IHL | Type of Service | Total Length | | IP Header |
|---|---|---|---|---|---|
| | Identification | | Fragment | Offset | [RFC791] |
| Time to Live = 1 | Protocol = ICMP | | Header Checksum | | |
| | | Source Address = home and/or foreign agent's address on this link | | | |
| | | Destination Address = 255.255.255.255 (broadcast) or | | | |
| | | 224.0.0.1 (multicast) | | | |
| Type = 9 | | Code | Checksum | | ICMP |
| Num Addrs | | Addrs Entry Size | Life Time (of this Advertisement) | | Router Advertisement |
| | | Router Address [1] | | | [RFC1256] |
| | | Router Level [1] | | | |
| | | Router Address [2] | | | |
| | | Router Level [2] | | | |
| Type = 16 | | Length | Sequence Number | | Mobility Agent |
| (maximum) Registration Lifetime | | | R B H F M G V | reserved | Advertisement |
| | | Care-of-Address [1] | | | Extension |
| | | Care-of-Address [2] | | | [RFC2002] |
| Type = 19 | | Length | Prefix Length [1] | Prefix Length [1] | Prefix-Length Extension [RFC2002] |

In Mobile IPv4 Stateless Address Autoconfiguration, a method of address establishment based upon assistance from the base station is as follows.

First, the host (mobile station) uses a FE80::/64, which is a link-local prefix, and a 48-bit interface identifier in order to induce a temporary link-local address. Also, for checking the uniqueness of the temporary link-local address, a neighbor solicitation message is broadcast to the network in order to perform duplicate address detection, and if the temporary link-local address is not a duplicate, then a router solicitation message is transmitted. Additionally, a router advertisement message is received to induce a global address.

TABLE 2

| Type | Code | Checksum |
|---|---|---|
| Reserved | | |
| Target Address | | |
| Options . . . | | |

Table 3 shows an example of a neighbor advertisement message for IPv6.

TABLE 3

| | Type | | Code | Checksum |
|---|---|---|---|---|
| R | S | O | | Reserved |
| | | Target Address | | |
| Options | | | | |

Table 4 shows an example of a router solicitation message for IPv6.

TABLE 4

| Type | Code | Checksum |
|---|---|---|
| Reserved | | |
| Options . . . | | |

Table 5 shows an example of a router advertisement for IPv6.

TABLE 5

| Type | Code | Checksum |
|---|---|---|
| CurHop Limit | M O Reserved | Router Lifetime |
| | Reachable Time | |
| | Retrans Timer | |
| Options . . . | | |

Table 6 shows an example of a 16-bit connection identifier (CID) defined in a broadband wireless access system of the related art.

TABLE 6

| CID | Value | Description |
|---|---|---|
| Initial Ranging | 0x0000 | Used by SS and BS during initial ranging process |
| Basic CID | 0x0001-m | The same value is assigned to both the DL and UL connection |
| Primary Management | m+1-2m | The same value is assigned to both the DL and UL connection |
| Transport CIDs and Secondary Mgt CIDs | 2m+1-0xFE9F | For the secondary management connection, the same value is assigned to both the DL and UL connection |
| Multicast CIDs | 0xFEA0-0xFEFE | For the DL multicast service, the same value is assigned to all MSSs on the same channel that participate in the connection |
| AAS initial ranging CID | 0xFEFF | A BS supporting AAS shall use this CID when allocating an Initial Ranging period for AAS devices |
| Multicast polling CIDs | 0xFF00-0xFFFD | A SS may be included in one or more multicast polling groups for the purposes of obtaining bandwidth via polling |
| Padding CID | 0xFFE | Used for transmission of padding information by SS and BS |
| Broadcast CID | 0xFFF | Used for broadcast information that is transmitted on a DL to all SS |

The above connection identifier is a unidirectional medium access control (MAC) layer address that identifies the connection of the equivalent peer entities within the MAC layer of the base station and of the mobile station, and each connection comprises the following.

A basic connection is established during ranging, and refers to the connection used for transmitting MAC management messages that are sensitive to delays. A primary connection refers to a connection established during ranging for transmitting MAC management messages that are not sensitive to delays. A secondary connection refers to a connection used for transmitting standard-based messages (e.g., DHCP, TFTP, etc.). Also, a transport connection is a connection used for transmitting user data.

FIG. 1 is an exemplary flow chart showing the procedures for initializing a mobile station in a broadband wireless access system. Referring to FIG. 1, when the initial power of the mobile station is turned on, the downlink channels are searched and uplink (UL) and downlink (DL) synchronizations with the base station are obtained (S111). Also, ranging is performed with the base station to adjust the uplink transmit parameters (S112), a basic management connection identifier and a first management connection identifier are allocated and received from the base station in order to negotiate the basic functions with the base station (S113). After performing authentication for the mobile station (S114), the mobile station is registered with the base station (S115). The mobile station being managed with an Internet Protocol (IP), is allocated a secondary management connection indicator by the base station and establishes an IP connection through that second management connection identifier (S116). Also, the current date and time are set (S117). The content file of the mobile station is downloaded from the TFTP server through the second management connection identifier (S118), and a connection is established for the service that was prepared (S119).

The IP connection establishment procedures using Mobile IPv4 or IPv6 according to the related art will now be explained.

First, the connection establishment procedures using Mobile IPv4 are as follows. For the IP currently used in most Internet environments, it is assumed that an IP address can be used to uniquely identify the access point of a node (host or router). In this case, for any node to receive a datagram transmitted thereto, it must be located within a network that includes its IP address. Thus, a datagram cannot be transmitted to any node that is not located within a network that includes its IP address.

In order to allow a node to change its access point while maintaining communication, one of the following two methods should be used. First, the node must change its IP address whenever its access point is changed, or second, the address of the host that moved must be transmitted to the entire Internet.

Both of these methods have problems. Namely, in the first method, when the node location changes, maintaining the connection between the transport layer and the upper layers of the node are difficult. Also, in the second method, actual implementation will be difficult when assuming that the number of moving nodes will increase. Accordingly, a more extended technique is required to support the mobility of the nodes in the Internet, and one method of supporting such mobility is Mobile IP.

FIG. 2 depicts an example of a network that supports Mobile IP. As shown in FIG. 2, a network that supports Mobile IP basically comprises a home agent (HA) (21), a foreign agent (FA) (22) and a mobile node (23).

The HA and FA are nodes for transmitting a datagram to the mobile node (23). When the mobile node (23) is in communication with a correspondent node (24), upon moving from a home network to a foreign network, procedures to support his are needed. The Mobile IP operates through the following procedures.

First, the mobile node (23) performs procedures to discover an agent. Namely, in order to inform of its existence, the mobile node has an agent or a mobility agent (which is a foreign agent) that employs a method of using an agent advertisement message, which corresponds to the Internet Control Message Protocol (ICMP) router discovery method used when an Internet host wishes to discover a router in the existing Internet procedures. Optionally, the mobile node (23) uses an agent obtaining message to obtain the agent advertisement message. The mobile node (23) receiving the agent advertisement message determines whether it is within its home network.

Also, is the mobile node (23) determines that it is in a foreign network, the Care-of-Address (COA) of the mobile node is registered in the HA (21). Namely, through the agent discovery procedure above, if the mobile node determines that it is in a foreign network, the mobile node and the HA exchange registration request and response messages to register the COA of the mobile node (23).

For the COA, two methods can be used. The first being a foreign agent COA that uses the FA (22) as the COA of the mobile node, and the second being a Co-located COA that allocates temporary IP addresses to the mobile node by a Dynamic Host Configuration Protocol (DHCP). These registered messages employ the User Datagram Protocol (UDP) port number 434 and includes the COA and lifetime of the mobile node.

The related art operation method according to the IPv6 based Stateless Address Autoconfiguration will now be explained. The host (mobile station) uses a FE80::/64, which is a link-local prefix, and a 64-bit interface identifier in order to induce a temporary link-local address. Also, to check the uniqueness of the induced temporary link-local address, a neighbor solicitation message is broadcast to the network to perform duplicate address detection. As a result of the check, if there are duplicate addresses, a neighbor advertisement response message is transmitted from the duplicate host.

As a result of the check, if there are no duplicate addresses, the host (mobile station) transmits a router solicitation message. Also, the received router advertisement message is used to induce a global address.

FIG. 3 shows a method for supporting an agent advertisement of Mobile IPv4 and a router advertisement of Mobile IPv6 in a broadband wireless access system.

As shown in FIG. 3, the base station (32) receives a Mobile IPv4 agent advertisement or a Mobile IPv6 router advertisement that is broadcast from the network (31), and the base station employs a secondary management connection for transmitting these to each mobile station in unicast. Here, the base station allocates a secondary management connection identifier during the procedure when the mobile station registers with the network.

In the broadband wireless access system of the related art, the secondary management connection is used to individually transmit to all mobile stations (31) of the current base station (32), the Mobile IPv4 agent advertisement or the Mobile IPv6 router advertisement that are broadcast from the network. However, even though the agent advertisement and the router advertisement are messages that are commonly broadcast to all mobile stations, such are individually transmitted, which leads to the problem of wasting radio resources.

In a broadband wireless access system, an idle mode of the mobile station is supported in order to minimize power consumption. During idle mode, the mobile station does not need to perform handoff procedures when moving between base stations within the same paging zone. Thus, because the mobile station need not transmit uplink information for handoff procedures, the power consumption needed thereof can be saved.

A general idle mode operation can be summarized as follows.

A paging zone refers to an overall region that is handled by a plurality of base stations called a paging group, and the base stations included within the same paging zone have the same paging cycle and paging offset values.

The mobile terminal can request the base station for change into idle mode, and the base station can change the corresponding mobile station into idle mode by delivering its paging zone ID, and the paging cycle and paging offset associated thereto.

During idle mode, it is possible for the base station to determine whether to maintain or end its idle mode through the paging that is delivered in broadcast format from the base station at each paging cycle that was agreed upon. When a mobile station in idle mode has traffic that needs to be delivered, the mobile station may end idle mode at any time. When a mobile station in idle mode has traffic that needs to be delivered, the base station may make the mobile station end its idle mode through paging. If a mobile station in idle mode does not receive paging within the set time period due to reasons such as moving to a different paging zone, losing synchronization, etc., the mobile station ends its idle mode.

In summary, as long as there is no data to be received or transmitted, a mobile station that entered idle mode can move freely within the same paging zone without performing handoff procedures by properly receiving periodic paging.

The procedures for a fixed/mobile station changing into idle mode are as follows.

1) The fixed/mobile station delivers to the service base station an idle mode request message in order to change into idle mode.

2) The service base station delivers a paging group ID, paging cycle and paging offset values to the fixed/mobile station through an idle mode response message, and the connection information with the fixed/mobile station, the radio resources allocated to the mobile station, etc. are released.

The following Table 7 shows an example of a message that the fixed/mobile station sends to the base station to request idle mode, by using an existing registration release request (DREG-REQ) message.

TABLE 7

| DREG-REQ message | | |
|---|---|---|
| Syntax | Size | Notes |
| DREG-REQ message format ( ) { | | |
| Management message type = 49 | 8 bits | |

TABLE 7-continued

DREG-REQ message

| Syntax | Size | Notes |
|---|---|---|
| De-registration_Request_Code | 8 bits | 0x00 = SS de-registration request from BS and network<br>0x01 = request for MSS de-registration from Service BS and initiation of MSS Idle Mode<br>0x02-0xFF = Reserved |
| TLV encoded parameters<br>} | variable | |

If the De-registration_Request_Code of the DREG-REQ is set to 0x01 (request to initiate Idle Mode), the following data is included in the DREG-REQ message and delivered to the fixed/mobile station.

TABLE 8

TLV encoding of DREG-REQ message

| Name | Type | Length | Value |
|---|---|---|---|
| Paging Cycle Request | ? | 2 | Requested cycle in which the paging message is transmitted within the paging group |
| Idle Mode Retain Information | nn | 1 | MSS request for Paging Controller retention of network re-entry related MAC management message MSS service and operational information to expedite future network re-entry from Idle Mode. For each bit location, a value of '0' indicates the information associated with the specified MAC management message is not requested to be retained and managed, a value of '1' indicates the information is requested to be retained and managed.<br>Bit #0: Retain MSS service and operational information associated with SBC-REQ/RSP MAC management messages<br>Bit #1: Retain MSS service and operational information associated with PKM-REQ-RSP MAC management messages<br>Bit #2: Retain MSS service and operational information associated with PKM-REQ-RSP MAC management<br>Bit #3: Retain MSS service and operational information associated with Network Address<br>Bit #4: Retain MSS service and operational information associated with Time of Day Acquisition<br>Bit #5: Retain MSS service and operational information associated with TFTP MAC management messages<br>Bit #6: Retain MSS service and operational information associated with Full service (MAC state machines, CS classifier information, etc.) |

The following Table 9 shows an example of an idle more response message that the base station sends to the fixed/mobile station, by using an existing registration release command (DREG-CMD) message.

TABLE 9

DREG-CMD message

| Syntax | Size | Notes |
|---|---|---|
| DREG_CMD_Message_Format<br>( ) { | | |

TABLE 9-continued

DREG-CMD message

| Syntax | Size | Notes |
|---|---|---|
| Management Message Type = 29 | 8 bits | |
| Action Code | 8 bits | |
| TLV encoded parameters<br>} | variable | |

The following Table 10 shows an example of the action code that may be used for the DREG-CMD message.

TABLE 10

DREG-CMD Action Code

| Action Code | Action |
|---|---|
| 0x00 | SS shall leave the current channel and attempt to access another channel |
| 0x01 | SS shall listen to the current channel but shall not transmit until an RES-CMD message or DREG_CMD with Action Code 0x00 is received |
| 0x02 | SS shall listen to the current channel but only transmit on the Basic, Primary Management, and Secondary Management Connections |
| 0x03 | SS shall return to normal operation and may transmit on any of its active connections |
| 0x04 | SS shall terminate current Normal Operations with the BS; the BS shall transmit this action code only in response to any SS DREG-REQ |
| 0x05 | Require MSS de-registration from Serving BS and request initiation of MSS Idle Mode |
| 0x06 | The MSS may retransmit the DRGE-REQ message after the time duration (REQ-duration) given by |
| 0x07 | The MSS shall not retransmit the DREG-REQ message and shall wait for the DREG-CMD message |
| 0x08-0xFF | Reserved |

If the DREG_CMD Action Code is set to 0x005 (allow Idle Mode), the following information is included in the DREG-CMD message and delivered to the fixed/mobile station.

TABLE 11

DREG-CMD message TLV encoding

| Name | Type | Length | Value |
|---|---|---|---|
| Paging Information | ? | 4 | Bits15:0 - PAGING_CYCLE-cycle in which the paging message is transmitted within the paging group<br>Bits 23:16 - PAGING_OFFSET - determines the frame within the cycle in which the paging message is transmitted. Must be smaller the PAGING_CYCLE value<br>Bits 31:24 - Paging-group-ID - ID of the paging group the MSS is assigned to |
| REQ-duration | ? | 1 | Waiting value for the DREG-REQ message re-transmission (Measured in frames) |
| Paging Controller ID | oo | 6 | This is a logical network identifier for the Serving BS or other network entity retaining MSS service and operational information and/or administering paging activity for the MSS while in Idle Mode |
| Idle Mode | pp | 1 | Idle Mode Retain Information is provided as part of this message is indicative only. |

TABLE 11-continued

DREG-CMD message TLV encoding

| Name | Type | Length | Value |
|---|---|---|---|
| Retain Information | | | Network re-entry from Idle Mode process requirements may change at time of actual re-entry. For each Bit location, a value of '0' indicates the information for the associated re-entry management messages shall not be retained and managed, a value of '1' indicates the information for the associated re-entry management message shall be retained and managed<br>Bit #0: Retain MSS service and operational information associated with SBC-REQ/RSP MAC management messages<br>Bit #1: Retain MSS service and operational information associated with PKM-REQ/RSP MAC management messages<br>Bit #2: Retain MSS service and operational information associated with REG-REQ/RSP MAC management messages<br>Bit #3: Retain MSS service and operational information associated with Network Address<br>Bit #4: Retain MSS service and operational information associated with Time of Day<br>Bit #5: Retain MSS service and operational information associated with TFTP MAC management messages<br>Bit #6: Retain MSS service and operational information associated with Full service (MAC state machines, CS classifier information, etc.) |

3) The base station informs that MAC address of the fixed/mobile station that changes into idle mode to all base stations in its paging group to allow paging of the fixed/mobile station by using the same paging cycle (PAGING_CYCLE, PAGING OFFSET).

4) The fixed/mobile station that has received permission to change into idle mode through the idle mode response message, determines through the paging message delivered in broadcast format from the base station according to the paging cycle, whether there is any downlink traffic to be delivered, whether ranging needs to be performed, or whether idle mode state is to be maintained.

The following Table 12 shows an example of a paging announce message that the base station (that permitted the fixed/mobile station to transition into idle mode) delivers to the paging controller or to all base stations within the same paging zone. The base station that permitted idle mode can deliver this message to the paging controller, which forms the message into another format and can deliver it to all base stations within the same paging zone.

TABLE 12

Paging announce message

| Field | Size | Notes |
|---|---|---|
| Message Type | 8-bit | |
| Sender BS-ID | 48-bit | Base station unique identifier (same number as that broadcasted on the DL-MAP message) |
| Recipient BD-ID | 48-bit | Set to 0xffffff to indicate broadcast |
| Time Stamp | 32-bit | Number of milliseconds since midnight GMT (set to 0xffffffff to ignore) |
| Num MSS | 8-bit | Number of MSSs to page |
| For (j = 0; j < Num MSS; j++) { | | |
| MSS MAC address | 48-bit | |
| Paging Group ID | 8-bit | The identifier of the paging group to which the MSS belongs |
| PAGING CYCLE | 16-bit | MSS PAGING CYCLE parameter |
| PAGING OFFSET | 8-bit | MSS PAGING OFFSET parameter |
| Action Code | 3-bit | 0 = MSS enters Idle Mode<br>1 = MSS exits Idle Mode<br>2 = MSS should be paged to perform ranging to establish location and acknowledgement message<br>3 = MSS should be paged to enter network<br>4~7 = reserved |
| Reserved } | 5-bit | |
| Security field | TBD | A means to authenticate this message |
| CRC field | 32-bit | IEEE CRC-32 |

The following Table 13 shows an example of a paging message received by the fixed/mobile station at certain periods from the base stations of a paging group.

TABLE 13

Broadcast format paging message
BS Broadcast Paging (MOB_PAG-ADV) message format

| Syntax | Size | Notes |
|---|---|---|
| MOB_PAG-ADV_Message_Format | | |
|   Management Message Type=?? | 8 bits | |
|   Num_Paging Group IDs | 8 bits | Number of Paging Group IDs in this message |
|   For (i=0; i<Num_Paging_Group_IDs; i++) { | | |
|     Paging Group ID | 8 bits | |
|   } | | |
|   For (j=0; j<Num_MACs; j++) { | | Number of MSS MAC Addresses in message can be determined from the length of the message (found in the generic MAC header) |
|     MSS MAC Address hash | 24 bits | The hash is obtained by computing a CRC24 on the MSS 48-bit MAC address. The polynomial for the calculation is 0x864CFB |
|     Action Code | 2 bits | Paging action instruction to MSS<br>00= No action required<br>01= Perform Ranging to establish location and acknowledge message<br>10= Enter network<br>11= reserved |
|     Reserved | 6 bits | |
|   } | | |
| } | | |

5) When the fixed/mobile station receives from the paging message that there is downlink traffic, the idle mode state is ended and the downlink data traffic is received upon re-registration with the network.

6) When the idle mode state is ended and upon re-registration with the network, ranging is used to re-register with the network.

The following Table 14 shows a ranging response message that is transmitted in response to the ranging request message, and Table 15 shows the information that is added to the ranging response when location update is performed or upon re-registration with the network after idle mode is ended. Through this, the base station informs of the valid data maintained at the network, such that the steps that may be omitted when the mobile/fixed station re-registers with the network can be known.

TABLE 14

RNG-RSP message

| Syntax | Size | Notes |
|---|---|---|
| RNG-RSP_Message_Format ( ) { | | |
|   Management Message Type = 5 | 8 bits | |
|   Uplink Channel ID | 8 bits | |
|   TLV Encoded Information | variable | TLV specific |
| } | | |

TABLE 15

Ranging response (RNG-RSP) TLV message

| | | | |
|---|---|---|---|
| HO Process Optimization | nn | 1 | For each Bit location, a value of '0' indicates that associated re-entry management messages shall be required, a value of '1' indicates that re-entry management messages may be omitted. Regardless of the HO Process Optimization TLV settings, the Target BS may send unsolicited SBC-RSP and/or REG_RSP management messages<br>Bit #0: Omit SBC-REQ/RSP management messages during current re-entry processing<br>Bit #1: Omit PKM_REQ/RSP management messages during current re-entry processing<br>Bit #2: Omit REG-REQ/RSP management messages during current re-entry processing<br>Bit #3: Omit Network Address Acquisition management messages during current re-entry processing<br>Bit #4: Omit Time of Day Acquisition management messages during current re-entry processing |

TABLE 15-continued

| | | Ranging response (RNG-RSP) TLV message |
|---|---|---|
| | | Bit #5: Omit TFTP management messages during current re-entry processing<br>Bit #6: Full service and operational state transfer ir sharing between Serving BS and Target BS (ARQ, timers, counters, MAC state machines, etc.)<br>Bit #7: Post-HO re-entry MSS DL data pending at Target BS |
| HO ID | 1 | The identifier assigned to a MSS during HO by a Target BS |
| Location Update Response | 1 | 0x00= Failure of Location Update. The MSS shall perform Network Re-entry from Idle Mode<br>0X01= Success of Location Update<br>0x10, 0x11: Reserved |
| Paging Information | 4 | Paging Information shall only be included if Location Update Response=0x01 and if Paging Information has changed<br>Bits15:0 - PAGING_CYCLE-cycle in which the paging message is transmitted within the paging group<br>Bits 23:16 - PAGING_OFFSET - determines the frame within the cycle in which the paging message is transmitted. Must be smaller the PAGING_CYCLE value<br>Bits 31:24 - Paging-group-ID - ID of the paging group the MSS is assigned to |
| Paging Controller ID | 6 | This is a logical network identifier for the Serving BS or other network entity retaining MSS service and operational information and/or administering paging activity for the MSS while in Idle Mode. Paging Controller ID shall only be included if Location Update Response=0x01 and if Paging Controller ID has changed |

7) Other than the method above, the fixed/mobile station performs location update through ranging at the point of time corresponding to the update conditions for location update, and the messages in the above Tables 7 and 8 are used. The location update conditions include when the paging zone is changed, when the timer has expired, etc.

8) If the paging message instructs the fixed/mobile station no to take any action, the idle mode state is maintained without any particular action being taken.

9) If the fixed/mobile station has uplink traffic or downlink traffic, or if the idle mode is ended because the paging group has been passed to another base station, the base station informs this to the other base stations within the same paging group, to allow the corresponding fixed/mobile station to be deleted from the list of idle mode fixed/mobile stations.

Except for the above situations where the idle mode mobile station performs location update or when downlink traffic or uplink traffic is generated, the mobile station only performs the procedures to receive paging messages periodically transmitted from the base station, such that free movement within the same paging zone is guaranteed without performing handover procedures, to thus minimize power consumption of the mobile station.

In the related art when changing into idle mode, the mobile station can request in the idle mode request message the management resource information that the base station wishes to maintain, and the base station, through the idle mode response message, can inform the management resource information to be maintained after the mobile station changed into idle mode. Here, through the exchange of idle mode request and response messages, the IP address information of the mobile station can be maintained by the base station after the mobile station changes into idle mode.

By periodically receiving an agent advertisement message and a router advertisement message that are transmitted from the network, the mobile station using Mobile IPv4 and IPv6 must update the validity of the IP that it maintains, but a mobile station in idle mode only performs operations for receiving paging messages and thus cannot receive control messages that are broadcast periodically by the network. An idle mode mobile station that did not receive an agent advertisement message and a router advertisement message, can delivers agent solicitation and router solicitation messages to request transmission of agent advertisement and router advertisement messages, but to do so, the idle mode must be ended. As such, even if the mobile station changed into idle mode to save power, its idle mode is ended every time it cannot receive a control message that is periodically transmitted from the network, and thus the problem of not achieving the effect of minimizing power consumption for changing into idle mode occurs.

Accordingly, the present invention provides a method to allow\reception of agent advertisement messages and router advertisement messages that are broadcast from the network, even when the Mobile IPv4 and IPv6 mobile station changes into idle mode, to allow updating of the validity of the IP maintained by the mobile station while minimizing power consumption.

PURPOSE OF THE INVENTION

The present invention has been proposed to solve the problems of the related art by providing a message transmission method that allows the messages related to IP address establishment that are broadcast from the network to be transmitted in broadcast or multicast format over the radio interface of a broadband wireless access system and to allow reception at the mobile station, regardless of its operation mode (normal operation mode or idle mode).

SUMMARY OF THE INVENTION

The present invention provides a broadcast dedicated connection identifier that is used for broadcasting IP control messages to allow proper IP address establishment for IPv4 and IPv6.

DETAILED DESCRIPTION

Figure 1:
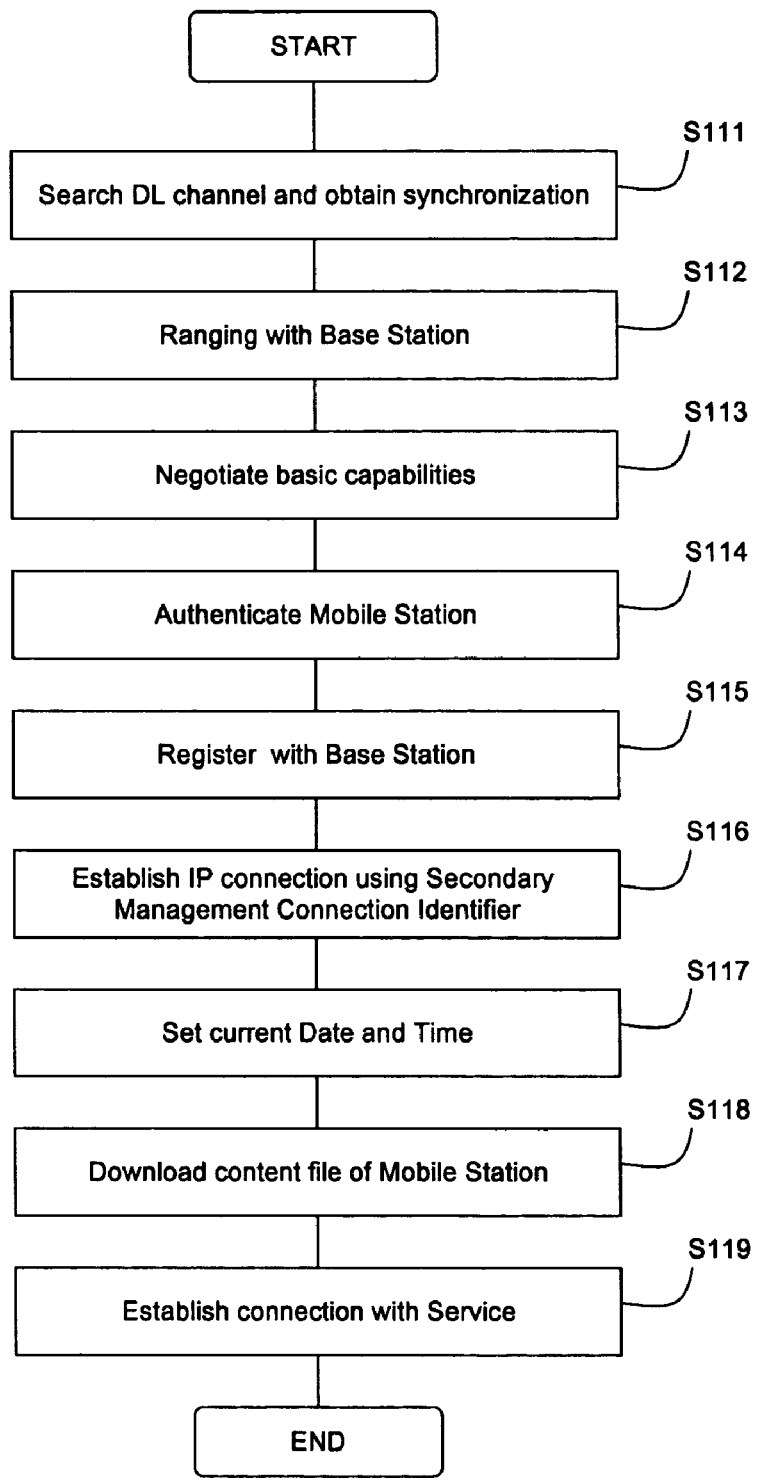
FIG. 1 depicts an exemplary flow chart of the initialization procedures of a mobile station in a broadband wireless access system.
Figure 2:
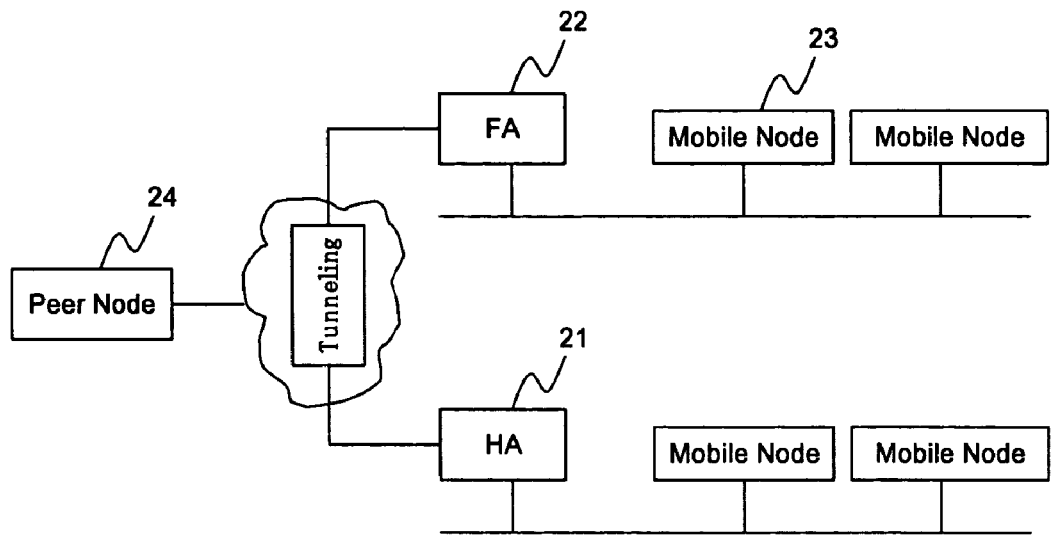
FIG. 2 depicts an example of a network that supports Mobile IP.
Figure 3:
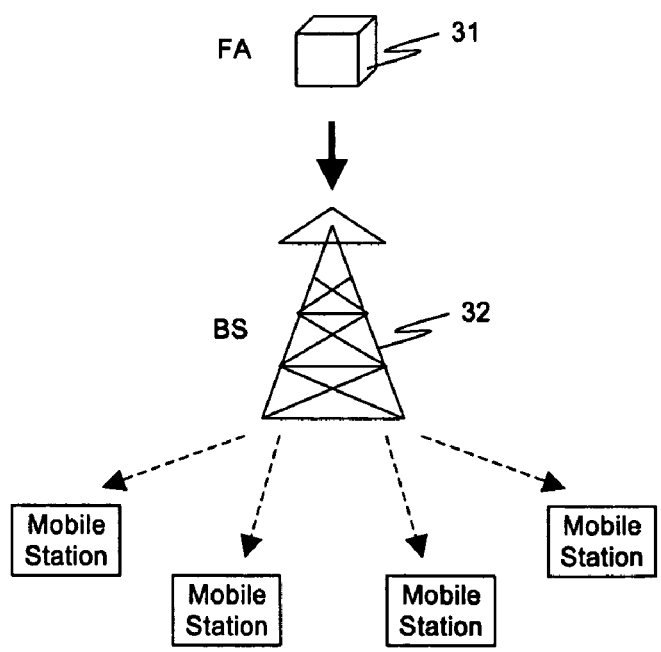
FIG. 3 depicts a method of how an agent advertisement of a Mobile IPv4 and a router advertisement of a Mobile IPv6 are transmitted.

The preferred exemplary embodiments of the present invention will now be explained. However, those skilled in the art would understand that the features of the present invention should not be limited to only the embodiments described herein.

The related art does not clearly provide a definition of how IP control messages are to be delivered, and the secondary CID of the related art is unicast, namely, message are sent to each mobile station individually. As such, problems arise because in IPv4 and IPv6, certain types of information (e.g., agent advertisement messages, router advertisement messages, neighbor solicitation messages, etc.) need to be broadcast from the network to base stations and to mobile stations. To address the related art problems, the present invention provides a broadcast dedicated connection identifier that is used for broadcasting IP control messages to allow proper IP address establishment for IPv4 and IPv6.

According to the present invention, in a broadband wireless access system that includes a network, a base station, and at least one mobile station, a method for the base station to transmit a message for Mobile IPv4 address establishment, comprising: receiving an agent advertisement message form the network; and transmitting the agent advertising message to all Mobile IPv4 mobile stations that are part of the base station by using a particular connection identifier.

in a broadband wireless access system that includes a network, a base station, and at least one mobile station, a method for the base station to transmit a message for IPv6 address establishment, comprising: receiving a router advertisement message form the network; and transmitting the router advertising message to all IPv6 mobile stations that are part of the base station by using a particular connection identifier.

In a broadband wireless access system that includes a network, a base station, and at least one mobile station, a method for the base station to transmit a message for IPv6 address establishment, comprising: receiving a uniqueness checking message (neighbor solicitation) to determine a uniqueness of a temporary address established for a mobile station from the base station; and transmitting the uniqueness checking message to all mobile stations that are part of the base station by using a particular connection identifier (CID).

In a broadband wireless access system that includes a network, a base station, and at least one mobile station, a method by a Mobile IPv4 and IPv6 mobile station of receiving a message for IP address establishment transmitted from the base station, comprising: changing into idle mode, and receiving a IP address establishment message delivered from the network through a particular connection identifier.

The above purpose, features and advantages of the present invention will become more apparent through the attached drawings and detailed description. The attached drawings will be referred to for explaining the preferred embodiments of the present invention.

The present invention provides the structure and establishing method of a connection identifier used for establishing and maintaining IP addresses, and for allowing a base station (which is an example of a point of attachment (PoA) with a network) to transmit in broadcast or multicast format, messages that are broadcast from the network (e.g., Mobile IPv4 agent advertisement messages and Mobile IPv6 router advertisement messages), to mobile stations that are managed through an IP connection in a broadband wireless access system. However, among the messages related to IP address establishment and maintaining, if unicast transmission between the base station (or point of attachment) and mobile station is required, the message is transmitted in a point-to-point manner by using a secondary management CID or a transport CID.

A first embodiment of the connection identifier according to the present invention is as follows.

For transmitting a message that was broadcast from the network, all base stations (i.e., all points of attachment) of a broadband wireless access system employ a particular connection identifier. Namely, as with MAC related messages of broadcast format being transmitted through a connection identifier of 0xFFFF, when the base station (point of attachment) transmits to a mobile station a message that was broadcast from the network, such transmission is performed by using a particular connection identifier that was previously agreed upon between the mobile station and the base station (point of attachment).

Table 16 shows an example of a 16 bit connection identifier defined in a broadband wireless access system according to the present invention.

TABLE 16

| CID | Value | Description |
| --- | --- | --- |
| Initial Ranging | 0x0000 | Used by SS and BS during initial ranging process |
| Basic CID | 0x0001 – m | The same value is assigned to both the DL and UL connection |
| Primary Management | m + 1 – 2m | The same value is assigned to both the DL and UL connection |
| Transport CIDs nd Secondary Mgt CIDs | 2m + 1 – 0xFE9F | For the secondary management connection, the same value is assigned to both the DL and UL connection |
| Multicast CIDs | 0xFEA0-0xFEFD | For the DL multicast service, the same value is assigned to all MSSs on the same channel that participate in the connection |
| Broadcast or Multicast Network Mgt CID | 0xFEFE | Used for transmission of IP related broadcast messages to all managed MSSs |
| AAS initial ranging CID | 0xFEFF | A BS supporting AAS shall use this CID when allocating an Initial Ranging period for AAS devices |
| Multicast polling CIDs | 0xFF00-0xFFFD | A SS may be included in one or more multicast polling groups for the purposes of obtaining bandwidth via polling |
| Padding ClD | 0xFFE | Used for transmission of padding information by SS and BS |
| Broadcast CID | 0xFFF | Used for broadcast information that is transmitted on a DL to all SS |

As in the above embodiment, through use of a single particular connection identifier, a method of receiving management messages broadcast from the network is possible for Mobile IPv4 and IPv6, and a method of receiving management messages broadcast from the network using respectively different connection identifier is also possible. The following shows an example of a 16 bit connection identifier that allows the base station (or other type of point of attachment) to deliver messages that were broadcast from the network in Mobile IPv4 and IPv6 through use of respectivey different connection identifiers.

TABLE 17

| CID | Value | Description |
| --- | --- | --- |
| Initial ranging | 0x0000 | Used by SS and BS during initial ranging process |
| Basic CID | 0x0001 – m | The same value is assigned to both the DL and UL connection |
| Primary management | M + 1 – 2m | The same value is assigned to both the DL and UL connection |
| Transport CIDs and Secondary mgt CIDs | 2m + 1 0xFE9F | For the secondary management connection, the same value is assigned to both the DL and UL connection |
| Multicast CIDs | 0xFEA0 0xFEFC | For the DL multicast service, the same value is assigned to all MSSs on the same channel that participate in the connection |
| Multicast Network Mgt CID for IPv4 | 0xFEFD | Used for transmission of Mobile IPv4 related broadcast messages to all MSSs managed by Mobile IPv4 |
| Multicast Network Mgt CID for IPv6 | 0xFEFE | Used for transmission of IPv6 related broadcast messages to all MSSs managed by IPv6 |
| AAS initial ranging CID | 0xFEFF | A BS supporting AAS shall use this CID when allocating an Initial Ranging period for AAS devices |
| Multicast polling CIDs | 0xFF00 0xFFFD | A SS may be included in one or more multicast polling groups for the purposes of obtaining bandwidth via polling |
| Padding CID | 0xFFE | Used for transmission of padding information by SS and BS |
| Broadcast CID | 0xFFF | Used for broadcast information that is transmitted on a DL to all SS |

Next, a second embodiment of the connection identifier according to the present invention is as follows.

During the process of the mobile station performing procedures for registering with the network, the base station (or other type of point of attachment) allocates to the mobile station, a connection identifier according to a network provider for transmitting a message that is broadcast form the network. (For example, a connection identifier of 0xFEF0 for a message broadcast from network provider A, while a connection identifier of 0xFEF1 for a message broadcast from network provider B, may be used by the base station to deliver to the mobile stations). When the mobile station first registers with the network, or while performing handover to a different base station (point of attachment), the value of the connection identifier (that is allocated per network provider) may be included in the registration response (REG-RSP) message delivered by the base station to the mobile station in order to inform the mobile station.

Table 18 shows an example of a 16 bit connection identifier defined in a broadband wireless access system according to the present invention.

Table 20 shows an example of a TLV format of a network management connection identifier that can be included in the registration response (REG-RSP) message.

TABLE 19

TLV encoding of network provider identifier

| Name | Type | Length | Value |
|---|---|---|---|
| Operator ID | xxx.1 | 3 | Unique ID assigned to the operation |

TABLE 20

TLV encoding of network management connection identifier

| Name | Type | Length | Value |
|---|---|---|---|
| Multicast Network Mgt CID | xxx.2 | 2 | 16 bit CID value |

TABLE 18

| CID | Value | Description |
|---|---|---|
| Initial Ranging | 0x0000 | Used by SS and BS during initial ranging process |
| Basic CID | 0x0001 – m | The same value is assigned to both the DL and UL connection |
| Primary Management | m + 1 – 2m | The same value is assigned to both the DL and UL connection |
| Transport CIDs, Secondary Mgt CIDs | 2m + 1 – 0xFE9F | For the secondary management connection, the same value is assigned to both the DL and UL connection. |
| Multicast CIDs | 0xFEA0-0xFEEF | For the DL multicast service, the same value is assigned to all MSSs on the same channel that participate in the connection |
| Multicast Network Mgt CID | 0xFEF0-0xFEFE | Used for transmission of IP related broadcast messages to all managed MSSs |
| AAS initial ranging CID | 0xFEFF | A BS supporting AAS shall use this CID when allocating an Initial Ranging period for AAS devices |
| Multicast polling CIDs | 0xFF00-0xFFFD | A SS may be included in one or more multicast polling groups for the purposes of obtaining bandwidth via polling |
| Padding CID | 0xFFE | Used for transmission of padding information by SS and BS |
| Broadcast CID | 0xFFF | Used for broadcast information that is transmitted on a DL to all SS |

There are two types of methods for allocating the network management connection identifier according to network providers as follows.

First, during network registration and handover, the mobile station delivers to the base station, an identifier of the network provider that it is part of through a registration request (REG-REQ) message or a mobile station basic capability request (SBC-REQ) message, the base station delivers to the mobile station through a network management connection identifier registration response (REG-RSP) message allocated to the corresponding network provider, and the mobile station can receive the management message broadcast from the network through the network management connection identifier received from the base station.

The following Table 19 shows an example of a TLV format of a network provider identifier that can be included in the registration request (REG-REQ) message or the mobile station basic capability request (SBC-REQ) message, while Second, when the mobile station performs network registration or during handover, the base station includes mapping information of the network provider identifier and the network management connection identifier into the registration response (REG-RSP) message and delivers such to the mobile station, which can then receive the management message that is broadcast from the network, through the network management connection identifier that is allocated to the network provider that the mobile station is part of. The following Table 21 shows an example of this in TLV (Type, Length, Value) format, Table 21-2 shows how the 16 bit connection identifier allocated with respect to the network provider identifier can be directly informed, and Table 21-2 shows how the connection identifier allocated with respect to the network provider identifier can be informed to the mobile station through an index.

TABLE 21

| Name | Type | Length | Value |
| --- | --- | --- | --- |
| Multicast Network Mgt CID info | xxx | Variable | Compound |

TABLE 21-1

| Name | Type | Length | Value |
| --- | --- | --- | --- |
| Operator ID | xxx.1 | 3 | Unique ID assigned to the operator |
| Multicast Network Mgt CID | xxx.2 | 2 | 16 bit CID value |

TABLE 21-2

| Name | Type | Length | Value |
| --- | --- | --- | --- |
| Operator ID | xxx.1 | 3 | Unique ID assigned to the operator |
| Multicast Network Mgt CID index | xxx.2 | 1 | 8 bit CID value |

Hereafter, the procedures for transmitting from the base station (point of attachment) to a mobile station in broadcast or multicast format, the IP related messages transmitted from the network, by using the above-identified broadcast or multicast format network management connection identifier.

Figure 4:
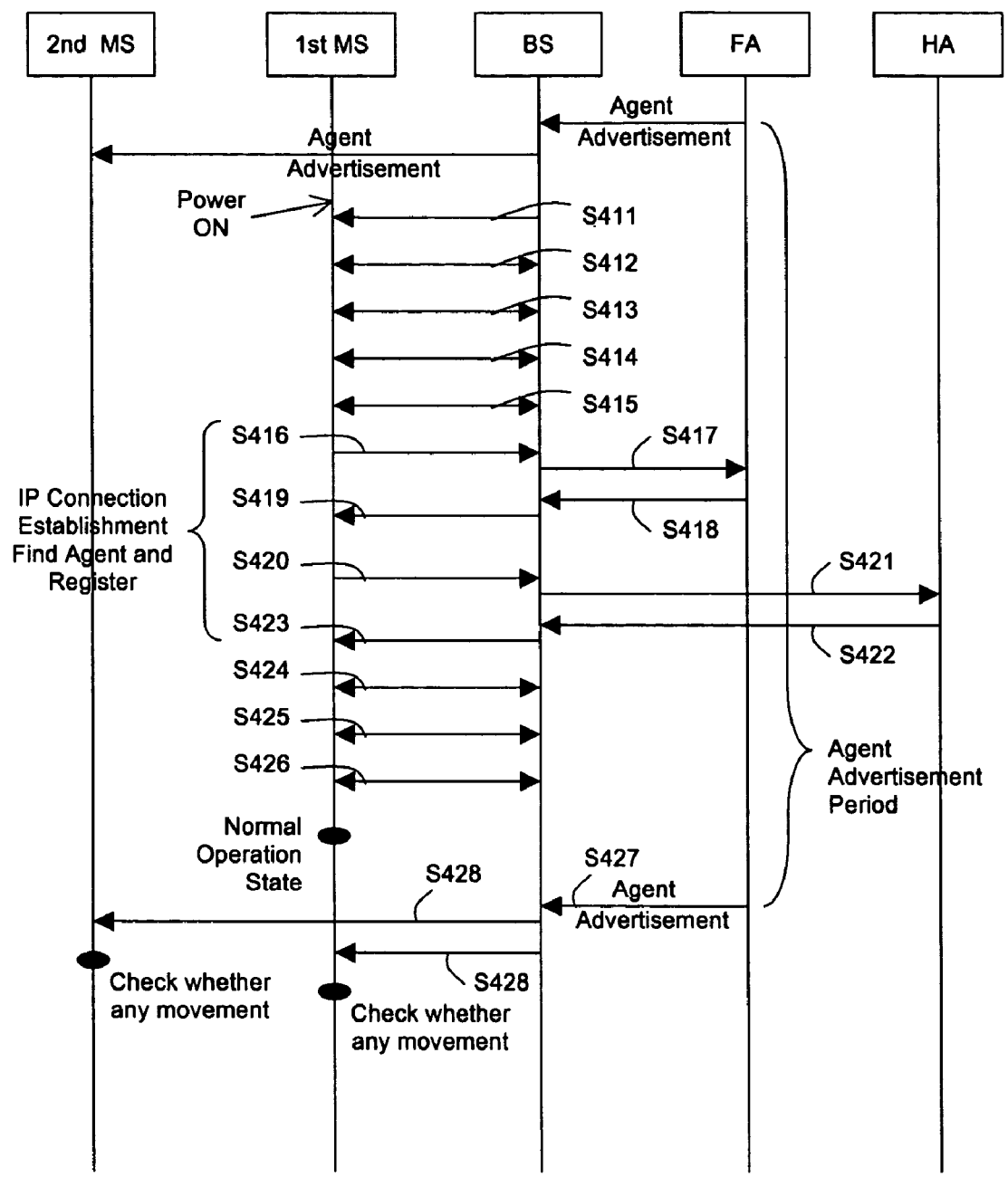
FIG. 4 depicts a method of how the IP related messages sent from the network are transmitted by the base station to the mobile stations according to a first embodiment of the present invention.

FIG. 4 shows a flow chart of a first embodiment for a method of transmitting by the base station to the mobile stations, IP related messages that were transmitted from the network. This embodiment can employ a connection identifier (CID) having the structure of the first embodiment connection identifier. The base station using this connection identifier, transmits in broadcast or multicast format to the mobile station, the Mobile IPv4 related messages received from the network.

Referring to FIG. 4, the first embodiment of the present invention can be explained as follows. Upon power on, the mobile station searches the downlink channels, and obtains uplink/downlink synchronization with the base station (S411). Also, by performing ranging with the base station, the uplink transmission parameters are adjusted, and a basic management connection identifier and a primary management CID are allocated by and received from the base station (S412). The mobile station performs negotiation of the basic functions with the base station (S413), and performs authentication (S414). When the mobile station is registered with the base station, the mobile station being managed by IP, is allocated a secondary management CID from the base station (S415).

The mobile station uses the secondary management connection or transmission connection to transmit an agent solicitation message to the mobile agent (FA or HA) (S416). The base station transmits to the mobility agent, the agent solicitation message received from the mobile station through the secondary connection or transmission connection. The foreign agent (FA) or the home agent (HA) that receives the agent solicitation message from the mobile station transmits an agent advertising message to the base station (S418), and the base station transmits to the corresponding mobile station through the secondary management or transmission connection (S419).

If the mobile station is part of a foreign agent, in order to register the address of the foreign agent (obtained from the agent advertisement message) with the home agent, a registration request message is transmitted to the base station through the secondary management connection or transmission connection (S420), and the base station transmits a registration request message to the home agent (S421). The home agent receiving the registration request, registers the location of the mobile station (binding the address of the foreign agent of the mobile station with the home address), and transmits a registration response message to the base station (S422). Through the secondary management connection or transmission connection, the base station transmits the registration response message received from the home agent to the mobile station (S423).

After completing the IP connection establishment procedures, the mobile station sets the current date and time (S424). The content file of the mobile station is downloaded from the TFTP server through the secondary management connection (S425), and the connection for the previously prepared service is established (S426). The mobile station that completed its network registration procedures changes into normal operation state.

The base station periodically receives the agent advertisement message from the FA (S427), and transmits these to the Mobile IPv4 mobile stations within the base station (S428). Here, the transmission can be performed through a broadcast or multicast format network management connection identifier according to that proposed in the connection identifier first embodiment. Namely, the base station can use a fixed value (e.g., 0xFEFE) that was pre-defined between the mobile station and the base station as the connection identifier used for transmitting the agent advertisement message. Here, all mobile stations using the Mobile IPv4 receive the agent advertisement message transmitted through the corresponding connection identifier. The mobile station receiving the agent advertisement message determines whether the FA address it is maintaining is valid, and updates the Mobile IPv4 address validity.

When the mobile station performs handover with a different foreign agent network, the mobile station performs steps (S416) through (S423) of the registration procedures for the handover target base station in order to establish an IP connection. If the mobile station performs handover within the same foreign network, the IP connection establishing procedures for the handover target base station may be omitted. Also, regardless of entry into another foreign agent network, after handover, the mobile station periodically receives agent advertisement messages from the base station through the same network management connection identifier as before.

Figure 5:
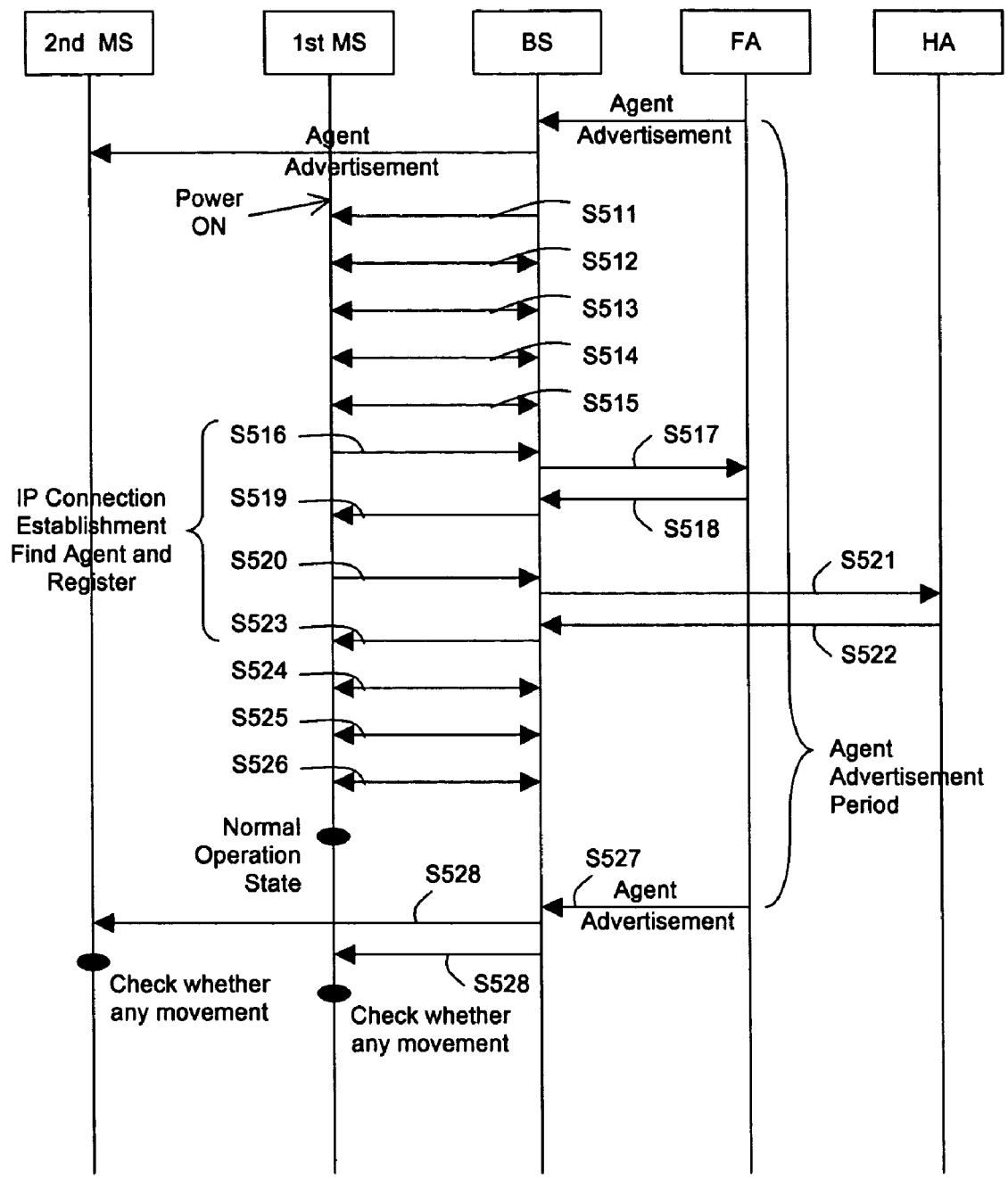
FIG. 5 depicts a method of how the IP related messages sent from the network are transmitted by the base station to the mobile stations according to a second embodiment of the present invention.

FIG. 5 shows a flow chart of a second embodiment for a method of transmitting by the base station to the mobile stations, IP related messages that were transmitted from the network. In this embodiment, the connection identifier having a format provided in the second embodiment can be used. The base station uses the above connection identifier to transmit the Mobile IPv4 and related network messages to the mobile station in broadcast or multicast format.

Referring to FIG. 5, the second embodiment of the present invention will be explained. Upon power on, the mobile station searches the downlink channels and obtains uplink/downlink synchronization with the base station (S511). Also, ranging with the base station is performed to adjust uplink transmission parameters, and a basic management connection identifier and a primary management connection identifier are allocated from the base station (S512). The mobile station performs negotiation of basic functions with the base station (S513) and authentication for the mobile station is performed (S514). When the mobile station is registered with the base station, the mobile station being managed by IP receives a second management connection identifier and a network management connection identifier for the network provider identifier allocated from the base station (S515).

However, if the mobile station delivers the network provider identifier to the base station by including it in the registration request (REG-REQ) message or in the mobile station basic capability request (SBC-REQ) message, the base station includes the network management connection identifier that was allocated to the corresponding network provider identifier into the registration response (REG-RSP) message as shown in Table 20, and allocates it to the mobile station. If the mobile station does not deliver the network provider identifier to the base station by including it in the registration request (REG-REQ) message or in the mobile station basic capability request (SBC-REQ) message, the base station delivers to the mobile station, the mapping information of the network provider identifier and the network management connection identifier as shown in Table 21, and the mobile station receives the management message broadcast form the network through the network management connection identifier with respect to the identifier of the network provider that it is part of.

The mobile station uses the second management connection or transmission connection to transmit an agent solicitation message to the mobility agent (FA or HA) (S516). The base station transmits the agent solicitation message received from the mobile station to the FA through the second management connection or transmission connection. The FA that received the agent solicitation message from the mobile station, transmits an agent advertisement message to the base station (S518), and the base station transmits to the corresponding mobile station through the second management connection identifier or transmission connection identifier (S519).

In order to register the address of the foreign agent (obtained through the agent advertisement message) with the home agent, the mobile station transmits a registration request message to the base station through the second management connection or transmission connection (S520), and base station transmits the registration request message to the home agent (S521). The home agent that received the registration request registers the location of the mobile station (binding the foreign agent address with the home agent address), and transmits a registration response message to the base station (S522). The base station transmits to the corresponding mobile station, the registration response message received from the home agent through the second management connection or transmission connection (S523).

The mobile station that completed the IP connection establishment procedures then sets the current date and time (S524), and the content file of the mobile station is downloaded from the TFTP server through the second management connection (S525). The connection for the previously prepared service is established (S526) and the mobile station that completed the network registration procedures changes to a normal operation state.

The base station periodically receives an agent advertisement message from the FA (S527), and transmits such to the Mobile IPv4 mobile stations within the base station (S528). Here, the transmission can be performed through a broadcast or multicast format network management connection identifier (allocated according to the network provider) according to that proposed in the connection identifier second embodiment. Namely, the Mobile IPv4 mobile station receives the agent advertisement message transmitted through the network management connection identifier allocated during the registration process, determines whether the FA address it is maintaining is valid, and updates the Mobile IPv4 address validity.

When the mobile station performs handover with a different foreign agent network, the mobile station performs steps (S516) through (S523) of the registration procedures for the handover target base station in order to establish an IP connection. If the mobile station performs handover within the same FA network, the IP connection establishing procedures for the handover target base station may be omitted. Also, the mobile station in normal operation state periodically receives agent advertisement messages from the base station through the network management connection identifier (according to the network provider) allocated from the base station through step (S515) during handover.

However, if one base station is connected with various network providers, in order to receive after handover, the agent advertisement message broadcast from the network that it is part of, the mobile station receives mapping information about the network provider identifier and the network management connection identifier, and based on these, the agent advertisement message broadcast from the network that it is part of can be received. Also, if roaming is supported between network providers, even if the mobile station undergoes handover to a base station connected to a network of another provider, the agent advertisement message can still be received through the network management connection identifier that was allocated to that other network provider, thus allowing Mobile IPv4 address validity to be updated.

Figure 6:
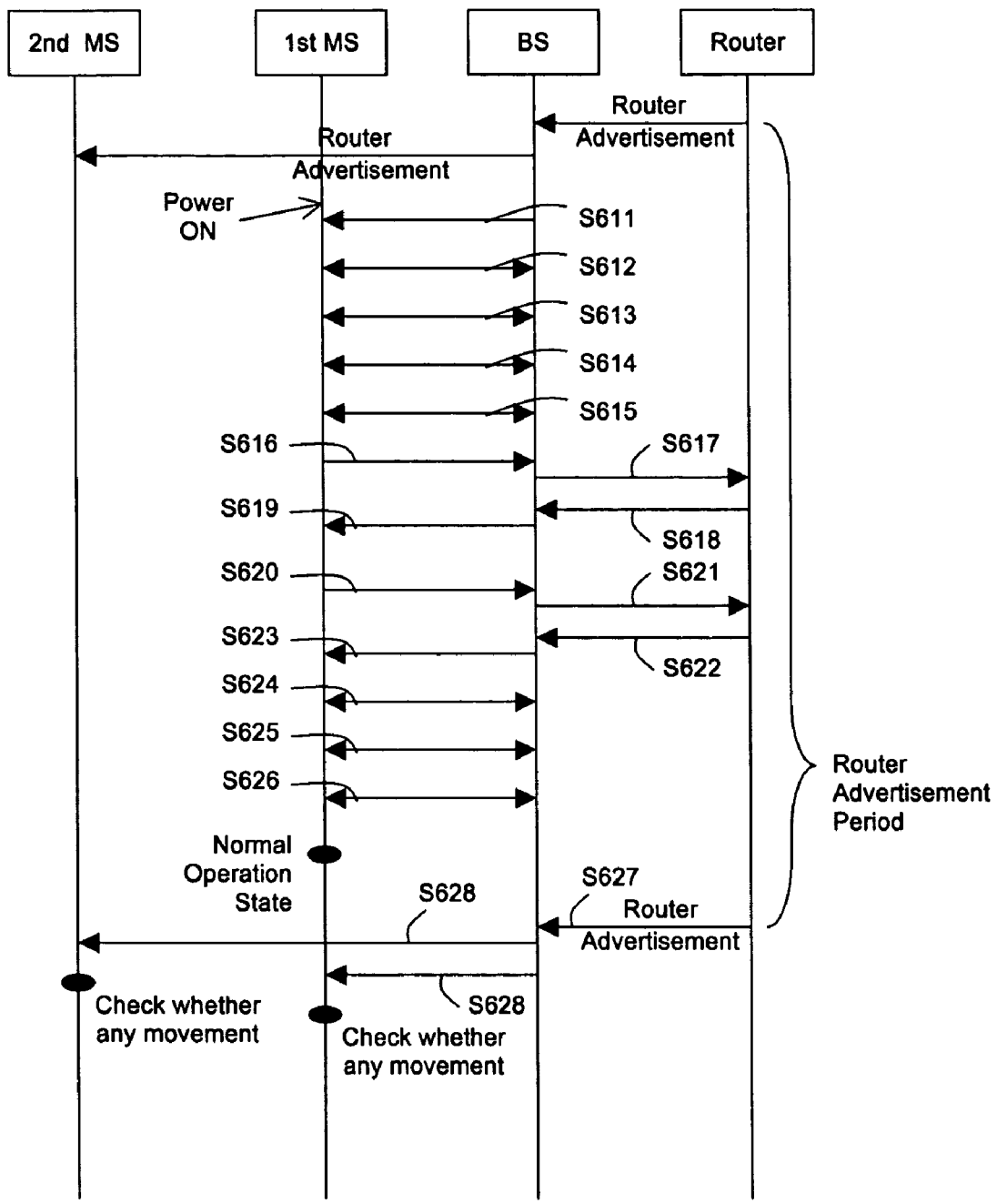
FIG. 6 depicts a method of how the IP related messages sent from the network are transmitted by the base station to the mobile stations according to a third embodiment of the present invention.

FIG. 6 shows a flow chart of a third embodiment for a method of transmitting by the base station to the mobile stations, IP related messages that were transmitted from the network. In this embodiment, the connection identifier can be of the form provided by the connection identifier first embodiment.

Referring to FIG. 6, the second embodiment of the present invention will be explained. Upon power on, the mobile station searches the downlink channels and obtains uplink/downlink synchronization with the base station (S611). Also, ranging with the base station is performed to adjust uplink transmission parameters, and a basic management connection identifier and a primary management connection identifier are allocated from the base station (S612). The mobile station performs negotiation of basic functions with the base station (S613) and authentication for the mobile station is performed (S614). When the mobile station is registered with the base station, the mobile station being managed by IP receives a second management connection identifier and a network management connection identifier allocated from the base station (S615).

The mobile station uses a FE80::/64, which is a link-local prefix, and a 64-bit interface identifier in order to induce a temporary link-local address. Also, to check any address duplicates of the induced temporary link-local address, a neighbor solicitation message is transmitted to the base station using a secondary management connection or transmission connection (S616). The base station transmits the neighbor solicitation message received from the mobile station to the router through the secondary management connection or transmission connection (S617).

The router transmits the received neighbor solicitation message to all base stations within the subnet (S618), and those base stations transmit the neighbor solicitation message to the IPv6 mobile stations through the network management connection identifier having a format provided by the connection identifier first embodiment (S619). The mobile station that received the neighbor solicitation message from the base station checks to see if there is any duplication with its address, and only if there is a duplicate, a neighbor advertisement message is transmitted.

If a neighbor advertisement message is not received during a certain time period by the mobile station that transmitted the neighbor solicitation message, the induced link-local address is determined to be unique. If the link-local address is determined to be unique, a router solicitation message is transmitted to the base station through the secondary management connection or transmission connection for finding a router (S620), and the base station transmits the router solicitation message received from the mobile station to the router (S621).

The router that received the router solicitation message transmits a router advertisement message to the base station (S622), and the base station uses the secondary management connection or transmission connection to transmit the router advertisement message to the corresponding mobile stations (S623). The received router advertisement message is used to induce a global address to perform IP connection establishment.

The mobile station that completes the IP connection establishment procedures sets the current data and time (S624), and the content file of the mobile station is downloaded from the TFTP server through the secondary management connection (S625). A connection for the previously prepared service is established (S626) and the mobile station that completed the network registration procedures change into normal operation state.

The base station periodically receives a router advertisement message from the router (S627), and such can be transmitted to the IPv6 mobile station within the base station through a network management connection identifier having a broadcast or multicast format according to the connection identifier first embodiment (S628). The mobile station receiving the router advertisement message determines whether the global address that it maintains is valid, and updates a list of valid routers.

In the above procedure (S627), the connection identifier used by the base station for transmitting a router advertisement message to the mobile station can be a fixed value (e.g., 0xFEFE) previously defined by the mobile station and the base station. Here, all IPv6 mobile stations receive the router advertisement message transmitted through the corresponding connection identifier. When the mobile station performs handover to another router (subnet) network, the mobile station establishes an IP connection by performing the steps (S617)~(S620) among the network registration procedures of the handover target base station.

If the mobile station performs handover within the same router (subnet) network, the IP connection establishment procedures using the steps (S617)~(S620) among the network registration procedures of the handover target base station may be omitted. Also, regardless of entry into another foreign agent network, after handover, the mobile station periodically receives agent advertisement messages from the base station through the same network management connection identifier as before.

Figure 7:
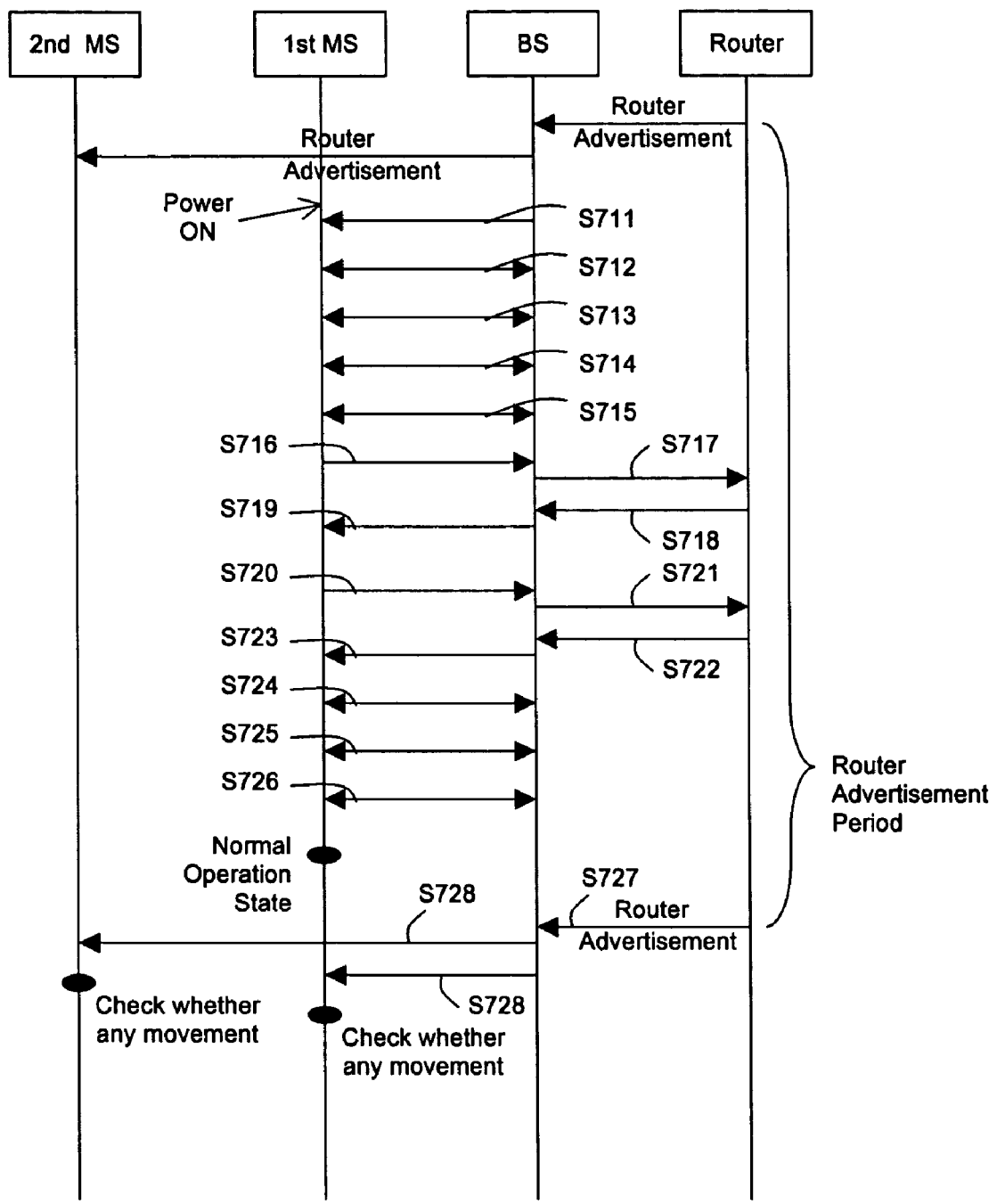
FIG. 7 depicts a method of how the IP related messages sent from the network are transmitted by the base station to the mobile stations according to a fourth embodiment of the present invention.

FIG. 7 shows a flow chart of a fourth embodiment for a method of transmitting by the base station to the mobile stations, IP related messages that were transmitted from the network. In this embodiment, the connection identifier can be of the form provided by the connection identifier second embodiment.

Referring to FIG. 7, the fourth embodiment of the present invention will be explained. Upon power on, the mobile station searches the downlink channels and obtains uplink/downlink synchronization with the base station (S711). Also, ranging with the base station is performed to adjust uplink transmission parameters, and a basic management connection identifier and a primary management connection identifier are allocated from the base station (S712). The mobile station performs negotiation of basic functions with the base station (S713) and authentication for the mobile station is performed (S714). When the mobile station is registered with the base station, the mobile station being managed by IP receives a second management connection identifier allocated from the base station (S715). Here, the base station allocates a network management connection identifier (according to the network provider) for transmitting a broadcast format neighbor solicitation message and a router advertisement message to the mobile station that uses IPv6.

However, if the mobile station delivers the network provider identifier to the base station by including it in the registration request (REG-REQ) message or in the mobile station basic capability request (SBC-REQ) message, the base station includes the network management connection identifier that was allocated to the corresponding network provider identifier into the registration response (REG-RSP) message as shown in Table 20, and allocates it to the mobile station. If the mobile station does not deliver the network provider identifier to the base station by including it in the registration request (REG-REQ) message or in the mobile station basic capability request (SBC-REQ) message, the base station delivers to the mobile station, the mapping information of the network provider identifier and the network management connection identifier as shown in Table 21, and the mobile station receives the management message broadcast form the network through the network management connection identifier with respect to the identifier of the network provider that it is part of.

The mobile station uses a FE80::/64, which is a link-local prefix, and a 64-bit interface identifier in order to induce a temporary link-local address. Also, to check any address duplicates of the induced temporary link-local address, a neighbor solicitation message is transmitted to the base station using the secondary management connection or transmission connection (S716). The base station transmits the neighbor solicitation message received from the mobile station to the router through the secondary management connection or transmission connection (S717).

The router transmits the received neighbor solicitation message to all base stations within the subnet (S718), and those base stations transmit the neighbor solicitation message to the IPv6 mobile stations through the network management connection identifier having a format provided by the connection identifier first embodiment (S719). The mobile station that received the neighbor solicitation message from the base station checks to see if there is any duplication with its address, and only if there is a duplicate, a neighbor advertisement message is transmitted.

If a neighbor advertisement message is not received during a certain time period by the mobile station that transmitted the neighbor solicitation message, the induced link-local address is determined to be unique. If the link-local address is determined to be unique, a router solicitation message is transmitted to the base station through the secondary management connection or transmission connection for finding a router (S720), and the base station transmits the router solicitation message received from the mobile station to the router (S721).

The router that received the router solicitation message transmits a router advertisement message to the base station (S722), and the base station uses the secondary management connection or transmission connection to transmit the router advertisement message to the corresponding mobile stations (S723). The received router advertisement message is used to induce a global address to perform IP connection establishment.

The mobile station that completes the IP connection establishment procedures sets the current data and time (S724), and the content file of the mobile station is downloaded from the TFTP server through the secondary management connection (S725). A connection for the previously prepared service is established (S726) and the mobile station that completed the network registration procedures change into normal operation state.

The base station periodically receives a router advertisement message from the router (S727), and such can be transmitted to the IPv6 mobile station within the base station through a network management connection identifier (according to the network provider) having a broadcast or multicast format according to the connection identifier first embodiment (S728). The mobile station receiving the router advertisement message determines whether the global address that it maintains is valid, and updates a list of valid routers.

As described above, the present invention proposes a connection identifier to allow a base station to transmit in broadcast or multicast format to the corresponding mobile stations, the messages broadcast from the network in order to establish connections for Mobile IPv4 and IPv6, and to manage such connections.

Figure 8:
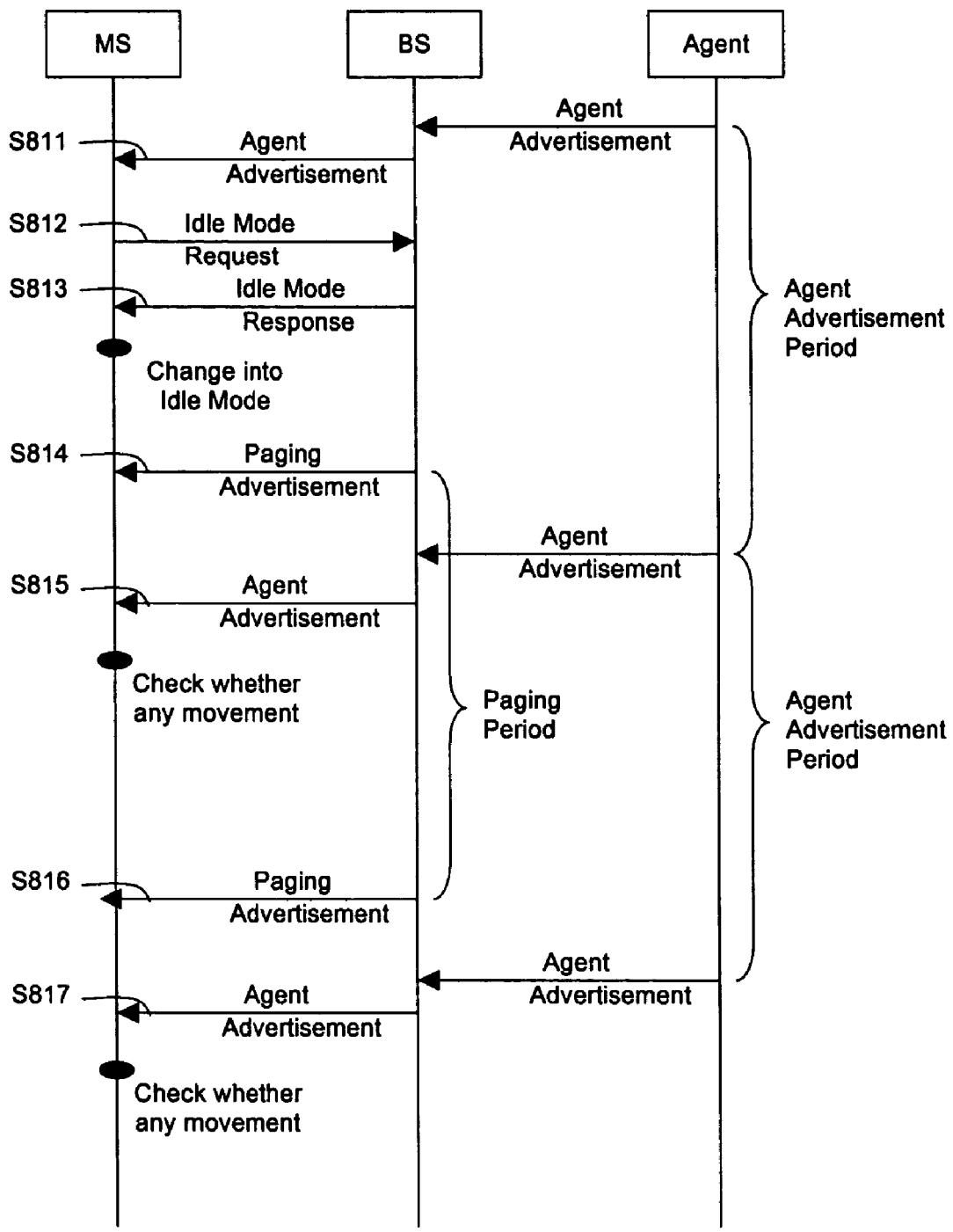
FIG. 8 depicts a first embodiment flow diagram of a method of transmitting an agent advertisement message from the base station to idle mode mobile stations according to the present invention.

Referring to FIG. 8, an embodiment of the present invention will be explained as follows. The base station periodically receives an agent advertisement message from the FA, and transmits such to the Mobile IPv4 mobile stations within the base station through the network management connection identifier having multicast format as proposed by the present invention (S811). Namely, through the network management connection identifier defined in the first and second embodiments of the present invention, each Mobile IPv4 mobile station receives the agent advertisement message, determines whether the FA address that it maintains is valid, and updates the validity of the Mobile IPv4 address.

To change into idle mode, the mobile station delivers an idle mode request message to the base station (S812). The base station delivers an idle mode response message to the mobile station to allow it to change into idle mode (S813). By periodically receiving paging advertisement messages of broadcast format from the base station, the mobile station receives instructions as to whether downlink traffic to be sent has been generated or whether it should perform location update procedures (S814). If instructed to maintain its idle mode through the paging advertisement message, the idle mode is maintained until the next paging advertisement message is delivered, to thus minimize power consumption.

After the mobile station updates the validity of the Mobile IPv4 address by receiving an agent advertisement message, when the next agent advertisement message delivery time arrives, the downlink synchronization with the base station is obtained and the downlink frames are continuously received, until the agent advertisement message is received via a particular connection identifier of multicast format as proposed by the present invention (S815). (To periodically transmit agent advertisement messages, the agent uses a randomly selected transmission period between pre-defined minimum and maximum periods to transmit the agent advertisement message to the network in broadcast format. Accordingly, a mobile station in idle mode receives an agent advertisement message and can maintain its idle mode for at least during the minimum transmission period.) The mobile station that received the agent advertisement message determines whether the FA address that it is maintaining is valid or not, updates the validity of the Mobile IPv4 address, and maintains idle mode state once again.

Figure 9:
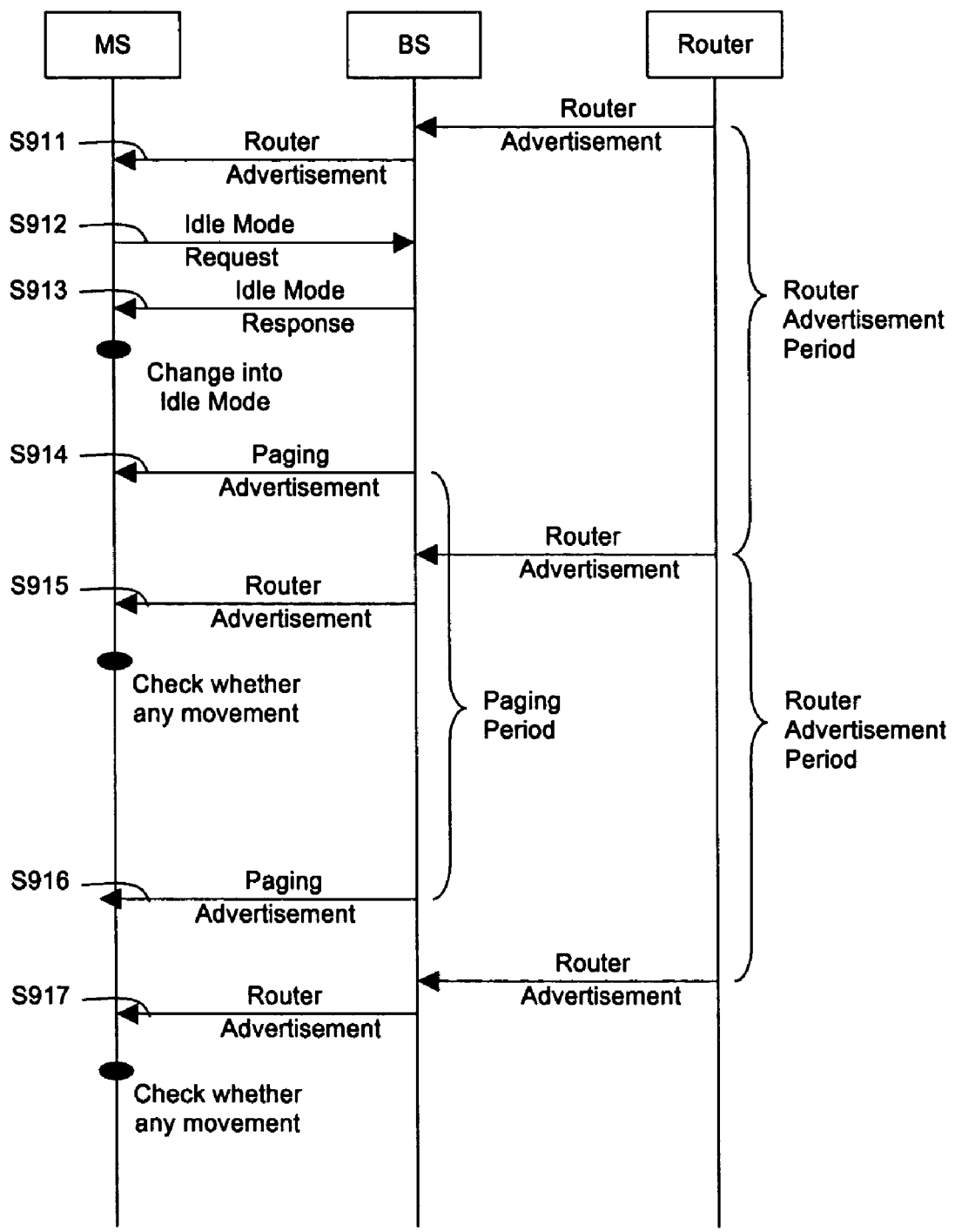
FIG. 9 depicts a second embodiment flow diagram of a method of transmitting a router advertisement message from the base station to idle mode mobile stations according to the present invention.

Referring to FIG. 9, an embodiment of the present invention will be explained as follows. The base station periodically receives a router advertisement message from the router, and transmits such to the IPv6 mobile stations within the base station through the network management connection identifier having multicast format as proposed by the present invention (S911). Namely, through the network management connection identifier defined in the first and second embodiments of the present invention, each IPv6 mobile station receives the router advertisement message, determines whether the router prefix information that it maintains is valid, and updates the validity of the IPv6 address.

To change into idle mode, the mobile station delivers an idle mode request message to the base station (S912). The base station delivers an idle mode response message to the mobile station to allow it to change into idle mode (S913). By periodically receiving paging advertisement messages of broadcast format from the base station, the mobile station receives instructions as to whether downlink traffic to be sent has been generated or whether it should perform location update procedures (S914). If instructed to maintain its idle mode through the paging advertisement message, the idle mode is maintained until the next paging advertisement message is delivered, to thus minimize power consumption.

After the mobile station updates the validity of the IPv6 address by receiving a router advertisement message, when the next router advertisement message delivery time arrives, the downlink synchronization with the base station is obtained and the downlink frames are continuously received, until the router advertisement message is received via a particular connection identifier of multicast format as proposed by the present invention (S915). (To periodically transmit router advertisement messages, the router uses a randomly selected transmission period between pre-defined minimum and maximum periods to transmit the router advertisement message to the network in broadcast format. Accordingly, a mobile station in idle mode receives a router advertisement message and can maintain its idle mode for at least during the minimum transmission period.) The mobile station that received the router advertisement message determines whether the router prefix information that it is maintaining is valid or not, updates the validity of the IPv6 address, and maintains idle mode state once again.

The mobile station periodically receives broadcast format paging messages (S916), and periodically receives router advertisement messages via a particular connection identifier of multicast format as proposed by the present invention (S917).

In the operation of the present invention, the procedures for transmitting an agent advertisement message, a neighbor solicitation message, and a router advertisement message from the base station to the mobile station through the connection identifier proposed in the present invention has been described. However, this is merely exemplary, as other types of standards-based management messages that need to be transmitted in broadcast or multicast format other than the MAC management messages of a broadband wireless access system may also be transmitted through the connection identifier proposed by the present invention.

Regarding the effects of the broadband wireless access system of the present invention, a connection identifier is defined in order to transmit in broadcast or multicast format from the broadband wireless access system, those messages broadcast from the network for address establishment, and the messages broadcast from the network can be transmitted to the mobile stations in broadcast or multicast format by using the above connection identifier, to thus save radio resources.

The present invention is related to the research and development being conducted by various IEEE working groups, such as IEEE 802.16, and thus the concepts and teachings involved therein are applicable to the features of the present invention.

For example, IEEE 802.16e uses DHCP (Dynamic Host Configuration Protocol) and Mobile IP in order to allocate IP addresses to Mobile Subscriber Stations (MSSs). However, when IPv6 is used, IP address is configured by either IPv6 Stateless Address Autoconfiguration (IETF RFC 2462) or Stateful Address Autoconfiguration protocol, such as DHCPv6 (IETF RFC 3315).

The present invention provides a modification to allow allocation of IPv6 addresses by stateful or stateless procedures. This is achieved by adding SS (mobile subscriber station) IPv6 addressing, and separating the IPv4 and IPv6 addressing.

For a MSS, if a mobile IP is being used, the MSS may secure its address on the secondary management connection using the mobile IP. Otherwise, for fixed subscriber stations and for MSSs using IPv4 and not using mobile IP, the subscriber station (SS) shall invoke DHCP mechanisms [IETF RFC 2131] in order to obtain an IP address and any other parameters needed to establish IP connectivity. The DHCP response shall contain the name of a file that contains further configuration parameters. For fixed SS and for MSSs using IPv6, the SS shall either invoke DHCPv6 [IETF RFC 3315] or IPv6 Stateless Address Auto-configuration [IETF RFC 2462] based on the value of the Type-Length-Value (TLV) tuple in the Registration Response (REG_RSP) message. Establishment of IP connectivity can be performed on the SS's secondary management connection.

The following Tables 22 and 23 show examples of TLV tuples used in a method for allocating IP addresses according to the present invention.

TABLE 22

| Type | Length | Value | Scope |
|------|--------|-------|-------|
| 5.23 | 1 | Bit #0: DHCP - default<br>Bit #1: Mobile IPv4<br>Bit #2: DHCPv6<br>Bit #3: IPv6 Stateless Address Autoconfiguration<br>Bit #4~7: reserved; shall be set to zero | REG_REQ<br>REG_RSP |

TABLE 23

| Type | Length | Value |
|------|--------|-------|
| 17 | 1 | Bit #0: DHCP<br>Bit #1: Mobile IPv4<br>Bit #2: DHCPv6<br>Bit #3: IPv6 Stateless Address Autoconfiguration<br>Bit #4~7: reserved; shall be set to zero |

Additionally, as various efforts are being made to implement the interworking of different types of networks and communication technologies, such as achieving compatibility between IEEE networks and cellular networks (such as, a third generation (3G) networks), it can be clearly understood that the present invention may also have applicability in achieving such compatibility.

As the present invention has been described above with respect to wireless access technologies, it can be clearly understood that various wireless access technologies currently under development (such as WiMax, WiBro, Wi-Fi, etc.) can also benefit from the features and teachings of the present invention, which are applicable because of the similarities involved in wireless communications involving user terminal mobility, handovers and idle mode operations.

The foregoing description of the preferred embodiments is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments shown herein but us to be accorded the widest scope consistent with the principles and novel features disclosed herein.

What is claimed is:

1. A method performed by a subscriber station for allocating Internet Protocol (IP) addresses for the subscriber station, the method comprising:

starting an initialization procedure by searching downlink channels and obtaining synchronization with a base station;

performing a ranging procedure with the base station to adjust uplink transmit parameters;

receiving, from the base station, allocation of a basic management connection identifier and a first management connection identifier in order to negotiate basic functions with the base station;

registering with the base station after authentication;

receiving, from the base station, allocation of a network management connection identifier for identifying a network service provider, a secondary management connection identifier used for IP connectivity after registering with the base station, and a transport connection identifier used for a data transmission connection;

transmitting, to the base station, an agent solicitation message using the transport connection identifier or the secondary management connection identifier; and receiving periodically, from the base station, an agent advertising message in a multicast or broadcast format through the transport connection identifier or the secondary management connection identifier, wherein the IP connectivity is achieved by:
    providing a set of parameters used for allocating the IP addresses to support four different types of addressing, the four different types of addressing comprising Dynamic Host Configuration Protocol (DHCP) addressing, IP version 4 (IPv4) addressing, DHCP version 6 (DHCPv6) addressing, and IP version 6 (IPv6) Stateless Address Autoconfiguration addressing,
    allocating one or more of the IP addresses for a secondary management connection by referring to the provided set of parameters, and
    establishing an IP connection on the secondary management connection using the one or more allocated IP addresses.

2. The method of claim 1, wherein establishing the IP connection complies with IEEE 802.16e that uses a DHCP and a Mobile IP by using an IPv6 Stateless Address Autoconfiguration (IETF RFC 2462) or Stateful Address Autoconfiguration protocol (IETF RFC 3315).

3. The method of claim 1, wherein establishing the IP connection allows allocation of IPv6 addresses by stateful or stateless procedures by using a mobile subscriber station IPv6 addressing, and separating the IPv4 addressing from IPv6 addressing.

4. The method of claim 1, wherein the subscriber station secures its address on the secondary management connection using a Mobile IP if the subscriber station is a mobile subscriber station (MSS) and if the Mobile IP is being used, and
    wherein the subscriber station invokes DHCP mechanisms (IETF RFC 2131) in order to obtain an IP address and any other parameters needed to establish the IP connection if the subscriber station is a fixed subscriber station or an MSS using the IPv4 and not using the Mobile IP, and wherein a DHCP response comprises a name of a file that contains further configuration parameters.

5. The method of claim 1, wherein the subscriber station either invokes a DHCPv6 (IETF RFC 3315) or an IPv6 Stateless Address Auto-configuration (IETF RFC 2462) based on the value of a Type-Length-Value (TLV) tuple in a Registration Response (REG_RSP) message if the subscriber station is a fixed subscriber station or a mobile subscriber station using the IPv6, such that establishing the IP connection is performed on the secondary management connection of the subscriber station.

6. The method of claim 5, wherein the TLV tuple is utilized to support the four different types of addressing.

7. The method of claim 6, wherein values of the TLV tuple comprise a Bit #0 corresponding to the DHCP addressing, a Bit #1 corresponding to the Mobile IPv4 addressing, a Bit #2 corresponding to the DHCPv6 addressing, and a Bit #3 corresponding to the IPv6 Stateless Address Autoconfiguration addressing.

8. The method of claim 7, wherein the Bit #0 is related to a registration request message (REG_REQ), and the Bit #1 is related to a registration response message (REG_RSP).

* * * * *